Patented May 7, 1940

2,199,940

UNITED STATES PATENT OFFICE 2,199,940

PROCESS FOR TREATING SYNTHETIC LUBRICATING OILS

Hendrikus Stokman, Amsterdam, Netherlands, assignor to Shell Development Company, San Francisco, Calif., a corporation of Delaware No Drawing. Application March 7, 1938, Serial No. 194,323. In the Netherlands March 12, 1937

1 Claim. (Cl. 196—147)

This invention relates to a process for producing viscous oils having viscosities higher than ordinary motor fuels, such as electrical insulating and lubricating oils, obtained by polymerization of olefines with active halide polymerization catalysts, which oils are free from harmful quantities of halogens.

It is known that synthetic oils produced by polymerization of lower boiling olefines with active halide catalysts retain after separation of the catalyst sludge from the polymerized oil and neutralization a small amount of chemically bound halogen. This halogen, if present in amounts substantially in excess of .002% is liable to cause trouble, some of the halogen being liberated slowly during use of the oils as lubricants due to thermal or catalytic decomposition in contact with metals, or during exposure to high electric potentials in transformers, electric switches, etc. Amounts of halogen of .002% and less are substantially harmless, oils containing these amounts having been found to give satisfactory service without undue corrosion or other difficulties.

The danger created by the presence of halogenated organic compounds formed during polymerization with halide catalysts has been recognized for some time, and attempts have been made to remove them. Thus it has been suggested to treat motor fuels containing chemically bound chlorine with alumina, inert silicates, pumice, etc. at temperatures above about 150° C. While this treatment apparently is satisfactory for motor fuels it was later found that it did not suffice for the heavier lubricating oils, the chlorine content being usually reduced by the suggested treatment to not less than about .05%. Therefore it was necessary to follow up this treatment with another one comprising heating the pre-treated oil with a small amount of an alkali metal or mercury to a temperature of about 150° to 315° C.

It is the purpose of this invention to provide a simple process whereby the halogen content of a viscous synthetic oil obtained by polymerization of olefines with active halide catalysts can be reduced to below the danger limit of .002% in a single step without having to resort to alkali metals, which are expensive, difficult to handle and dangerous; or to mercury which always forms oil-soluble organic complex compounds with certain of the components of the oils under treatment, thereby being consumed and dissolved in the oil and depreciating many of its important properties.

I have discovered that if a viscous polymerized oil having a viscosity higher than gas oil containing harmful quantities of halogen compounds produced during polymerization of olefines with halide polymerization catalysts, is treated with a small amount of bleaching clay, such as Fuller's earth, activated bentonite, activated montmorillonite, etc., at a temperature between about 200° and 300° C., the halogen is substantially eliminated, resulting in a dehalogenated oil containing .002% or less organic chemically bound halogen.

My treatment is essentially as follows: olefines or a cracked distillate containing substantial amounts of olefines are polymerized with an active halide catalyst, such as a Friedel-Crafts catalyst under conditions to produce an oil having a viscosity higher than gas oil. Sludge formed in the polymerization is carefully removed, and the substantially sludge-free oil containing free mineral acid is neutralized in a conventional manner, as by treating with lime, aqueous alkali metal hydroxide, or other alkaline reacting inorganic base. The neutralizing reagent is then removed and the neutralized oil is heated with a small amount of a bleaching clay to a temperature of 200° to 300° C. for a period of time which is preferably relatively short. Steam may be admitted to the oil while heating, and a substantial portion of the low boiling oils having viscosities of gas oil and/or lower which are formed as by-products in the polymerization of olefines to lubricating oils or are contained in the original olefinic distillate, may be distilled off during this period. The oil may then be cooled, filtered and if desired be further distilled.

It is of considerable advantage to carry out the heat treatment prior to or simultaneously with the distillation of low viscosity components of the oil. During the heat treatment hydrogen halide is liberated, which is largely removed overhead together with distillate during the distillation. To avoid undue corrosion, gaseous ammonia may be injected into the vapor space. The presence of steam in the treatment has the double purpose of aiding in the even distribution of the clay throughout the oil and of facilitating distillation of the light portions of the oil together with the hydrogen halide.

The time of maintaining the contact of clay and oil at the elevated temperature of the treatment, which may vary within wide limits depending on the temperature used, the initial halogen content of the oil and the activity of the clay, should in general not be less than about 10 minutes. If the contact time is substantially below this limit harmful quantities of halogen compounds are liable to remain in the oil. On the other hand, the contact time should not be unduly prolonged, because such a prolonged contact may render the oil unstable and liable to lose color rapidly upon further distillation to the desired viscosity and/or during storage.

I have further found that neutralization and dehalogenation may be combined by adding lime to the clay and heat-treating the unneutralized desludged polymerized oil.

In general, under the conditions of the dehalogenation process a certain improvement of the color of the polymer oil is attained. However, when subjecting the neutralized oil still containing lower boiling constituents to the heat treatment, the color of the treated oil, during the subsequent further distillation to the required viscosity, is in most cases somewhat darkened and therefore it is preferable to subject the concentrated oil to a final treatment with a clay at moderate temperatures, such as from 100-110° C., in order to effect a substantial improvement of the color. If an alkaline substance, such as lime, is present in the oil-clay mixture during dehalogenation for the purpose of effecting neutralization simultaneously with dehalogenation, darkening of the polymer oil may take place, which can mostly be corrected by a subsequent treatment with bleaching clay at moderate temperature.

The amount of clay to be added varies somewhat with the amount of organic halogen compounds contained in the polymer oil. Normally I use about 1 to 6% and preferably 2 to 4% clay by weight to the oil to be treated.

The following example further illustrates my process:

Paraffinous hydrocarbon oil was cracked in the vapor phase to produce a cracked distillate which was polymerized at about 100° C. with 4% aluminum chloride whereby a viscous oil and sludge was formed. The sludge was carefully separated and the resulting sludge-free oil was neutralized with about 1% of an aqueous solution of caustic soda having a concentration of 30%. The neutralized oil, which had a content of chemically bound chlorine of about .1% and a color of 5 (Union), was mixed with 4% of an acid activated bleaching-clay. After pre-heating to 90° C. the mixture was introduced into a shell still kept at 200° to 220° C. Steam was introduced into the bottom of the still. At the top of the still vapors consisting essentially of low boiling components of the polymer oil, steam and liberated HCl were discharged.

Heat-treated polymer oil containing spent clay was continuously withdrawn from the bottom of the still and was filtered. The filtered oil, which had a color of 2½ (Union), was concentrated by steam and vacuum distillation to a viscosity of about 15° E. at 50° C. The oil so obtained had a chlorine content below .001% and a color of 4 (Union). By further treating the oil with a percolation clay at 105° to 110° C. its color was improved to 3 (Union). The average contact time in the still was about 3½ hours but could be considerably shortened whilst still attaining a substantially complete dehalogenation.

I claim as my invention:

In the process of treating a synthetic, substantially sludge-free hydrocarbon oil produced by polymerization of olefines with an active halide polymerization catalyst, said oil consisting substantially of components having viscosities higher than gas oil and harmful quantities of organic halogen compounds produced in said polymerization, to remove said halogen compounds and to produce a treated oil containing not more than .002% of chemically bound halogen, the steps of contacting said oil with a bleaching clay in an amount of 1 to 6% by weight of the oil at a temperature between 200 and 300° C. for a time exceeding about 10 minutes but insufficient to render the oil unstable, filtering the treated oil, concentrating the oil by distillation to the required viscosity and then subjecting the concentrated oil to a decolorizing treatment with a bleaching clay at moderate temperature.

HENDRIKUS STOKMAN.